(12) United States Patent
Joonho

(10) Patent No.: US 10,625,187 B2
(45) Date of Patent: Apr. 21, 2020

(54) LIQUID FILTER ASSEMBLY HAVING A DRAIN PIN WITH A GRIP

(71) Applicants: Mahle Donghyun Filter Systems Co., Ltd., Ulsan (KR); Mahle International GmbH, Stuttgart (DE)

(72) Inventor: Park Joonho, Gyeonggi-Do (KR)

(73) Assignees: MAHLE DONGHYUN FILTER SYSTEMS CO., LTD. (KR); MAHLE INTERNATIONAL GMBH (DE)

( * ) Notice: Subject to any disclaimer, the term of this patent is extended or adjusted under 35 U.S.C. 154(b) by 0 days.

(21) Appl. No.: 16/065,667

(22) PCT Filed: Dec. 12, 2016

(86) PCT No.: PCT/EP2016/080668
§ 371 (c)(1),
(2) Date: Jun. 22, 2018

(87) PCT Pub. No.: WO2017/108483
PCT Pub. Date: Jun. 29, 2017

(65) Prior Publication Data
US 2018/0369726 A1 Dec. 27, 2018

(30) Foreign Application Priority Data
Dec. 24, 2015 (KR) .................. 10-2015-0185601

(51) Int. Cl.
*B01D 35/16* (2006.01)
*F01M 11/04* (2006.01)
(Continued)

(52) U.S. Cl.
CPC .......... *B01D 35/16* (2013.01); *B01D 35/005* (2013.01); *B01D 35/147* (2013.01); *F01M 11/03* (2013.01);
(Continued)

(58) Field of Classification Search
CPC .... B01D 35/16; B01D 35/005; B01D 35/147; F01M 11/0458; F01M 11/04; F01M 11/0408; F01M 2011/0416; F01M 11/03
See application file for complete search history.

(56) References Cited

U.S. PATENT DOCUMENTS 8,235,759 B1 * 8/2012 Belter .................. F01P 11/0276
114/183 R
9,778,041 B2 10/2017 Griffith
(Continued)

FOREIGN PATENT DOCUMENTS

| EP | 3043147 A1 | 7/2016 |
| JP | S61146805 U | 9/1986 |

(Continued)

OTHER PUBLICATIONS

English abstract JP-H11104408.
(Continued)

*Primary Examiner* — Jacob M Amick
(74) *Attorney, Agent, or Firm* — Fishman Stewart PLLC

(57) ABSTRACT

A liquid filter module may include a housing, a filter accommodated in the housing, and a drain pin. The housing may include a cylindrical drain nipple arranged on a lower portion thereof. The drain nipple may be configured to drain a liquid. The drain pin may be inserted into the drain nipple. The drain pin may include a body, a grip, and a seal member configured to seal the housing and prevent the liquid from leaking from the housing when the drain pin is inserted into the drain nipple. The grip may have a portion that at least protrudes outward from a wall of the drain nipple when the drain pin is inserted into the drain nipple. The filter may include a lower support plate. The drain pin may be detachably coupled to the lower support plate when the drain pin is inserted into the drain nipple.

20 Claims, 6 Drawing Sheets

(51) Int. Cl.
*B01D 35/147* (2006.01)
*B01D 35/00* (2006.01)
*F01M 11/03* (2006.01)

(52) U.S. Cl.
CPC ... *F01M 11/0458* (2013.01); *B01D 2201/291* (2013.01); *B01D 2201/4015* (2013.01); *F01M 2011/031* (2013.01)

(56) References Cited

U.S. PATENT DOCUMENTS

| 2006/0162505 | A1 | 7/2006 | Choi et al. | |
| 2014/0284266 | A1* | 9/2014 | Kamp | B01D 35/005 210/462 |
| 2015/0273371 | A1 | 10/2015 | Morris et al. | |
| 2016/0245250 | A1 | 8/2016 | Noguchi | |

FOREIGN PATENT DOCUMENTS

| JP | H07228202 A | 8/1995 |
| JP | H11104408 A | 4/1999 |
| JP | H11104409 A | 4/1999 |
| JP | 2007503961 A | 3/2007 |
| JP | 2014043906 A | 3/2014 |
| KR | 100775520 B1 | 11/2007 |
| WO | 2013178680 A1 | 12/2013 |
| WO | 2015050003 A1 | 1/2015 |

OTHER PUBLICATIONS

English abstract for KR-100775520.
Japanese Office Action dated Jul. 30, 2019 related to corresponding JP 2018-552120.
Japanese Notice of Allowance dated Nov. 5, 2019 related to corresponding Japanese Patent Application No. 2018-552120.

* cited by examiner

LIQUID FILTER ASSEMBLY HAVING A DRAIN PIN WITH A GRIP

CROSS-REFERENCE TO RELATED APPLICATIONS

This application claims priority to International Patent Application No. PCT/EP2016/080668, filed on Dec. 12, 2016, and Korean Patent Application No. KR 10-2015-0185601, filed on Dec. 24, 2015, the contents of both of which are hereby incorporated by reference in their entirety.

TECHNICAL FIELD

The present invention relates to an Liquid filter module for filtering liquids, particularly engine oil for vehicles, and more particularly, to an oil filter module in which a drain pin for draining engine oil is rotatably coupled to a filter.

BACKGROUND

The following description, often references on an oil filter and an application thereof in a motor vehicle, which it is of course clear that liquid filter according to the invention can also be used for filtering other liquids, such as for example fuel, so that the following remarks also apply in an analogous way to liquid filter and in particular to fuel filter. That means, that despite the description relates to an oil filter module, liquid filter module according to the invention is not limited thereto.

As widely well-known, when an engine is driven, liquid, particularly oil, may be supplied to each of friction portions within the engine to perform smooth lubrication and cooling at the friction portions. The liquid, particularly the oil, may be contaminated by various foreign substances such as metal particles, carbon particles, and oxides generated when the liquid, particularly the oil, is oxidized in proportion to an operation time of the engine. If the operation of the engine is continuous in the state in which the liquid, particularly the oil, is contaminated, the friction rotating portions such as a crankshaft and a cylinder may be gradually worn out and thus be damaged. When the abrasion becomes worse, the friction rotating portions may burn to cause the risk of accidents.

As described above, the maintenance of clean liquid, particularly oil, is very important because of being directly related to a lifecycle and performance of the engine. An oil filter module for example must be essentially installed in an oil circulating system of the engine, and the oil has to be maintained in the clean state.

After a predetermined period is elapsed, the used engine liquid, particularly the oil or the fuel, has to be drained, and then new oil has to be poured in. In case of the liquid filter module, particularly oil or the fuel filter module according to the related art, a method in which a drain bolt screw-coupled to a lower portion of the liquid filter module, particularly the oil or the fuel filter module is removed has been used as a method for draining the engine liquid, particularly the oil or the fuel. However, when the drain bolt for draining the engine liquid, particularly the oil or the the fuel, is screw-coupled to a drain hole, like the liquid filter module, particularly the oil or the fuel filter module according to the related art, since the inner liquid, particularly the oil or the fuel, flows down while the drain bolt is separated, the drain bolt, work tools, and worker's hands may be stained with the engine oil and thus contaminated. Also, in this process, the oil may be spattered on the workplace to contaminate the surroundings.

SUMMARY

To solve the foregoing problems, an object of the present invention is to prevent a drain pin, a tool, and worker's hands from being contaminated by engine liquid, particularly oil, when the drain pin is drawn out, by inserting the drain pin, but not a screw-coupled drain bolt, into a lower portion of the liquid filter module.

To achieve the foregoing object, a liquid filter module, particularly an oil filter module or a fuel filter module according to an embodiment of the present invention includes a housing having a cylindrical drain nipple on a lower portion thereof to drain liquid, particularly oil or fuel, a filter accommodated in the housing, and a drain pin inserted into the drain nipple. The drain pin includes a body, a grip, and a seal member. The grip at least protrudes outward from a wall of the drain nipple when the drain pin is inserted into the drain nipple. When the drain pin is inserted into the drain nipple, the seal member prevents the inner liquid, particularly the oil or the fuel, from flowing down. When a worker draws the drain pin out as occasion demands, the worker may grip the grip to draw the drain pin. The grip may be disposed on the outside of the drain nipple in the inserted state to allow the worker to grip and draw the drain pin.

The grip may be disposed on a lower portion of the drain nipple, and more preferably, the grip may protrude outward in a lateral direction from a downward extension line of a cylindrical wall of the drain nipple. Thus, while the worker separates the drain pin, the worker's hands may be spaced apart from a path through which the liquid, particularly oil or fuel, flows down and thus prevented from being contaminated by the liquid, particularly by the oil or the fuel.

The drain pin may include a reinforcing element such as a rib for reinforcing the grip on a portion at which the grip and the body are connected to each other to prevent the grip from being broken.

The grip may have a plate shape or a ring shape. The shape of the grip may variously vary for work convenience of the worker and thus not be limited to the above-described shapes.

The filter accommodated in the housing may include a lower support plate, and the drain pin may be detachably coupled to the lower support plate of the filter when the drain pin is inserted into the drain nipple. A unit for coupling the drain pin to the filter may be variously provided. Thus, any unit may be applied to prevent the drain pin from being unintentionally separated during the driving of the vehicle.

A liquid filter module, particularly an oil filter module or a fuel filter module, according to another embodiment of the present invention includes a housing having a cylindrical drain nipple on a lower portion thereof to drain oil, a filter accommodated in the housing, a drain pin inserted into the drain nipple, and a first fixing part for detachably fixing the drain pin to the inside of the drain nipple. The drain pin includes a body, a grip formed on the body, and a seal member sealing the housing to prevent the liquid, particularly oil or fuel, from leaking from the housing when the drain pin is inserted into the drain nipple.

The grip may be formed on a side surface of the body in a plate shape that extends in a lateral direction of the body, and the first fixing part includes: a guide block formed on a wall of the drain nipple; and an insertion hole formed in the grip of the drain pin and into which the guide block is inserted. A guide slot that serves as a boundary of the guide block may guide the drain pin when the grip having the plate shape is inserted upward and when the guide block is inserted into an insertion hole to rotate the drain pin. The guide block may be a portion of the wall of the drain nipple and extend to one side as if one tooth lies by using the guide slot as a boundary. The insertion hole may be formed in a boundary portion at which the grip meets the body and also lengthily formed in a longitudinal direction of the body so as to be coupled to the guide block.

Since the grip should include a structural feature including the insertion hole, the grip may protrude outward in the lateral direction from a downward extension line of a cylindrical wall of the drain nipple. Thus, while the worker separates the drain pin, the worker's hands may be spaced apart from a path through which the liquid, particularly oil or fuel, flows down and thus prevented from being contaminated by the oil.

The guide block may include a stepped protrusion for preventing the inserted drain pin from being reversely rotated. The stepped protrusion may be formed in a stair shape and also various shapes for preventing the drain pin from being reversely rotated. For example, to prevent the drain pin from being reversely rotated, the stepped protrusion may be inclined upward at a position at which the drain pin is rotated and coupled in a direction in which the coupling of the drain pin is released. If the inclined stepped protrusion is provided, the drain pin may be pulled downward by the gravity to prevent the drain pin from being unintentionally separated.

The guide block includes a cutoff part and a tension part, and the cutoff part is disposed between the stepped protrusion and the tension part. That is, when the drain nipple is viewed from a side surface, the cutoff part may be lengthily formed in a root direction of the guide block at a portion of the cutoff part that is disposed just below the protruding end of the guide block. Thus, the lower portion of the cutoff part may be defined as a tension part that is smoothly and elastically deformable in the direction of the cutoff part.

Since the stepped protrusion is provided, the guide block may have a uniform width from an upper end to a lower end thereof. If only the stepped protrusion is provided without the cutoff part, the insertion hole formed in the grip may serve as the fixing part only when a vertical width of the insertion hole is greater than a vertical width of an end side of the guide block. However, in this method, a gap between the insertion hole and the guide block may be essentially generated after the drain nipple and the drain pin are coupled to each other. Thus, to compensate the gap, the cutoff part may be necessary. That is, if the cutoff part is provided, even though the insertion hole has a width less than that (a width from an upper end of the stepped protrusion to a lower end of the tension part) of the end side of the guide block, force may be applied to the tension part through the insertion hole of the grip to allow the tension part to be elastically deformed. As a result, the width of the end of the guide block may be less than that of the insertion hole, and thus, the drain pin may be completely inserted. Also, after being inserted, the gap between the two members may be reduced to achieve the more firm coupling.

To more easily couple the insertion hole to the guide block, the guide block may include a tapered portion so that the guide block has a width that is gradually increased in the direction in which the drain pin is inserted from an inlet side of the guide slot.

The liquid filter module, particularly the oil filter module or the fuel filter module according to the present embodiment may further include a second fixing part. The second fixing part may include a rotation groove formed in a lower support plate provided in the filter, and a fixing block disposed on an upper end of the drain pin and coupled to the rotation groove.

A transverse length of the fixing block may be greater than a width of an inlet of the rotation groove, and a longitudinal length of the fixing block may be less than the width of the inlet of the rotation groove. Thus, when the drain pin is inserted into the drain nipple from an upper side, the fixing block may be inserted into the rotation groove. When the drain pin is rotated at an angle of about 90 degrees to insert the guide block into the insertion hole, the fixing block may be hung on the rotation groove. Thus, when the worker separates the drain pin, the worker may grip the grip of the drain pin that is in the inserted state to rotate the grip at an angle of about 90 degrees and then to draw the grip at once, thereby preventing the worker's hands from being contaminated by the oil.

The drain pin may include a rib for reinforcing the grip on a portion at which the grip and the body are connected to each other to prevent the grip from being broken.

In the liquid filter module, particularly the oil filter module or the fuel filter module according to the embodiments of the present invention, since the drain pin is quickly separated, the working speed for draining the engine liquid, particularly oil or fuel, may be improved, and also, the phenomenon in which the drain pin or the work tool is stained with the drained engine liquid, particularly oil or fuel, may be prevented. Particularly, since the grip includes the portion that at least protrudes outward from the wall of the drain nipple, the worker's hands may not be stained with the oil when the worker separates the drain pin.

In the liquid filter module, particularly the oil filter module or the fuel filter module according to the embodiments of the present invention, since the drain pin for draining the engine liquid, particularly oil or fuel, is coupled to the filter, the phenomenon in which the drain pin is separated against the user's intension may not occur.

In the liquid filter module, particularly the oil filter module or the fuel filter module according to the embodiments of the present invention, since the two fixing parts are provided to achieve more firm coupling, the phenomenon in which the drain pin is separated against the user's intention may not necessarily occur.

DETAILED DESCRIPTION

Hereinafter, an liquid filter module, particularly an oil filter module or a fuel filter module according to embodiments of the present invention will be described in detail with reference to the accompanying drawings.

The following description of the drawings, often references on an oil filter and an application thereof in a motor vehicle, which it is of course clear that liquid filter according to the invention can also be used for filtering other liquids, such as for example fuel, so that the following remarks also apply in an analogous way to liquid filter and in particular to fuel filter. That means, that despite the description relates to an oil filter module, the liquid filter module according to the invention is not limited thereto.

Figure 1:
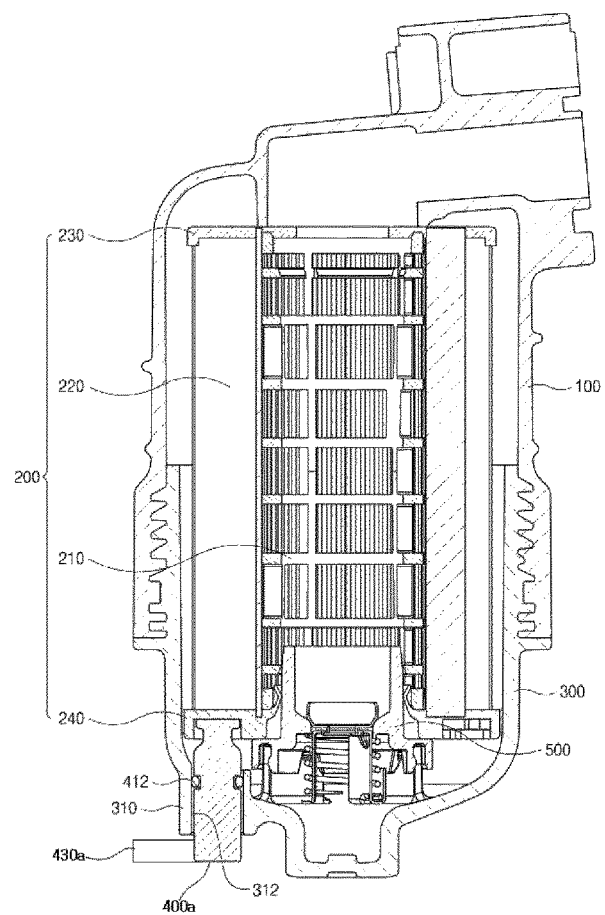
FIG. 1 is a vertical cross-sectional view of an liquid filter module, particularly the oil filter module or the fuel module according to a first embodiment of the present invention.

FIG. 1 is a vertical cross-sectional view according to a first embodiment of the present invention. An liquid filter module, particularly an oil filter module or a fuel filter module includes a housing (600) including a cylindrical drain nipple (310a) on a lower portion thereof so as to drain liquid, particularly oil or fuel, a filter (200) accommodated in the housing (600), and a drain pin (400a) inserted into the drain nipple (310a). The drain pin (400a) includes a body, a grip (430a) having a portion that at least protrudes outward from a wall of the drain nipple (310a) when being inserted, and a seal member (412) sealing the housing (600) so that the liquid, particularly the oil or the fuel, does not leak out of the housing when the drain pin (400a) is inserted into the drain nipple (310a).

According to a modified example of the first embodiment, the housing (600) may be divided into a case (100) and a cap (300) screw-coupled to the case (100). The drain hole (312) is formed in a bottom surface of the cap (300). When the drain pin (400a) is separated to open a drain hole (312) in a state in which the engine liquid, particularly oil or fuel, is filled in the case (100) and the cap (300), the engine liquid, particularly oil or fuel, filled in the case (100) and the cap (300) leaks to the outside through the drain hole (312). On the other hand, as illustrated in FIG. 1, in a state in which the drain pin (400a) is inserted into the drain nipple (310a) to close the drain hole (312), the engine liquid, particularly the oil or the fuel, introduced into the case (100) and the cap (300) does not leak to the outside, but is filtered by passing through a filter (200) and then is supplied again into an engine. Since a flow path for the engine liquid, particularly oil or fuel, in which the engine liquid, particularly the oil or the fuel, introduced into the case (100) and the cap (300) passes through the filter (200) and then is supplied again into the engine, is the same as the liquid filter module, particularly the oil filter module or the fuel filter module according to the related art, detailed descriptions with respect to a principle for filtering the engine liquid, particularly oil or fuel, and the flow path for the engine liquid, particularly oil or fuel, will be omitted.

Here, since a portion in which the drain hole (312) is formed has a thin thickness, when the drain pin (400a) is coupled to close the drain hole (312), the drain pin (400a) may be tilted toward one side and also be easily separated. Thus, the portion of the bottom surface of the housing (600), in which the drain hole (312) is formed, may be preferably formed as the drain nipple (310a) having a pipe shape that extends downward as illustrated in the present embodiment so as to increase an area in contact with the drain pin (400a).

Also, in the liquid filter module, particularly the oil filter module or the fuel filter module according to the related art, the drain bolt for opening and closing the drain path for the liquid, particularly oil or fuel, is screw-coupled to the cap. On the other hand, according to the present invention, the drain pin (400a) for opening and closing the drain hole (312) may be press-fitted and coupled to the drain nipple (310a). Thus, sealing force of the drain hole (312) may be reduced somewhat. Thus, it is preferable that the seal member (412) having an O-ring shape is disposed on an outer surface of the drain pin (400a). Here, when the portion in which the drain hole (312) is formed has a thin thickness, the seal member (412) may be out of an inner circumferential surface of drain hole (312) according to an inserted distance of the drain pin (400a). Thus, the drain hole (312) may be opened against the user's intention. However, as described in the present embodiment, when the drain hole (312) is formed in the drain nipple (310a), the contact distance between the drain (400a) and the drain nipple (310a) may be increased. Thus, even though the inserted distance of the drain pin (400a) varies somewhat, the seal member (412) may be disposed on the inner circumferential surface of the drain hole (312), and thus, the sealing reliability of the drain hole (312) may be improved.

Also, the filter (200) includes a support frame (210) having a pipe shape with a plurality of openings in a sidewall thereof, a filter paper (220) surrounding an outer surface of the support frame (210), an upper support plate (230) coupled to the support frame (210) to cover an upper end of the filter paper (220), and a lower support plate (240) coupled to the support frame (210) to cover a lower end of the filter paper (220). Also, when the liquid, particularly oil or fuel, is abnormally penetrated because the life of the filter paper (220) is ended, a bypass valve (500) may be provided in a lower end of an inner passage of the support frame (210) so that the engine liquid, particularly oil or fuel, supplied into the case (100) is bypassed to the outside of the case (100) through an inner passage of the support frame (210). Here, the case (100), the support frame (210), the filter paper (220), the upper support plate (230), and the bypass valve (500) are substantially the same as those of the liquid filter module, particularly the oil filter module or the fuel filter module according to the related art, and thus, their detailed descriptions will be omitted.

Figure 2:
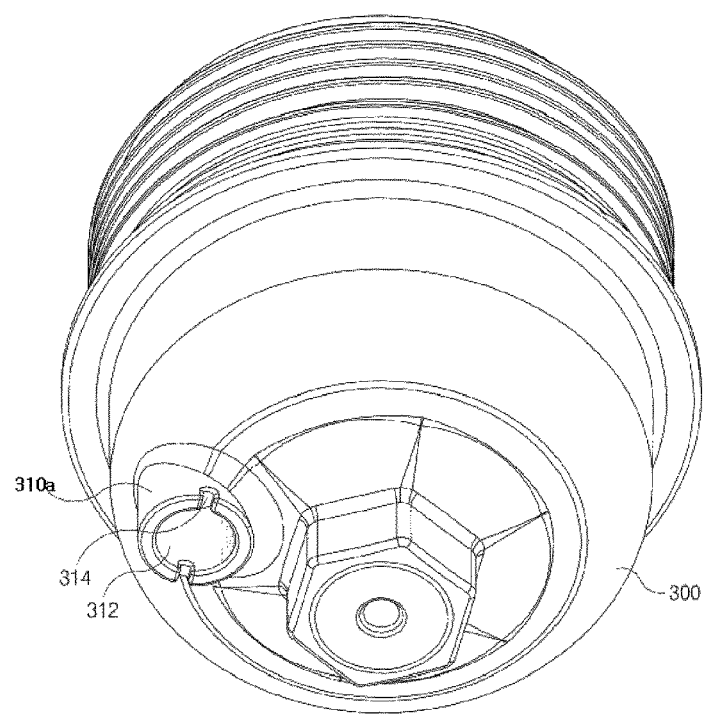
FIG. 2 is a bottom perspective view of a housing provided in the liquid filter module, particularly the oil filter module or the fuel filter module according to the first embodiment.
Figure 3:
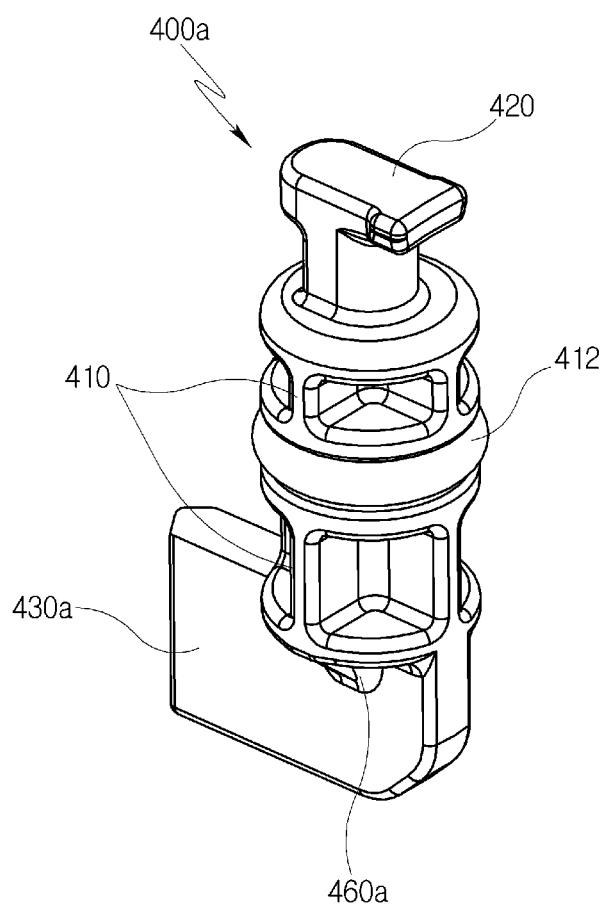
FIG. 3 is a perspective view of a drain pin according to the first embodiment.

FIG. 2 is a bottom perspective view of the cap (300) that is an element included in the housing (600), and FIG. 3 is a perspective view of the drain pin (400a). The cap (300) includes the drain nipple (310a), and the drain nipple (310a) includes a marking groove (314). The drain pin (400a) includes a coupling block (420) on an upper end thereof and a grip (430a) on a lower end thereof with respect to the body (410) and also includes the seal member (412) coupled to the body. The grip (430a) has a shape that extends laterally in a plate shape. This is done for a reason in which the worker easily grips the drain pin when the drain pin (400a) is coupled to the drain nipple (310a). The grip (430a) having the plate shape may be connected to a circular bottom of the lower end of the body (410). The grip (430a) may pass through a centre of the circular bottom, and four apexes in the plate shape may be angled or rounded in a rounded shape. In FIG. 3, the apex disposed on a portion to be griped by the worker may have an angled shape, and a lower end connected to the body may have a rounded shape. However, these shapes may be modified as occasion demands.

FIG. 3, the grip (430a) extends in a horizontal direction (a direction perpendicular to a longitudinal direction of the body (410)). This may be a configuration for allowing the worker to easily grip the grip. A length extending in the horizontal direction may be changed so that the worker easily grips the grip. The same is true of the height of the grip (430a). However, when the drain pin (400a) is completely inserted, the grip should not be disposed under the bottom part of the housing (600) or the cap (300).

The grip may have various configurations so that the worker easily grips the grip. For example, the grip may basically have a plate shape. However, if the portion griped by the worker is recessed when viewed from both sides of the grip, the worker may more comfortably grip the grip. Similarly, only one surface of the grip may be recessed. For another example, the grip may have a rough surface. Thus, even though the worker' hands are stained with sweat or a liquid, the grip may be manufactured to have frictional force for sufficiently inserting and removing the drain pin.

As illustrated in FIG. 3, one end of the grip may slightly protrude in the horizontal direction in which the grip (430a) extends and then be substantially rounded. This shape may be similar to a triangular shape having a rounded apex when the drain pin (400a) is viewed from an upper side. This shape may be valuable for preventing the worker from being injured by an edge of the grip when the worker grips or treats the grip. Like the one end of the grip (430a), all surfaces connecting both surfaces of the plate shape to each other may be rounded or protrude.

Figure 5:
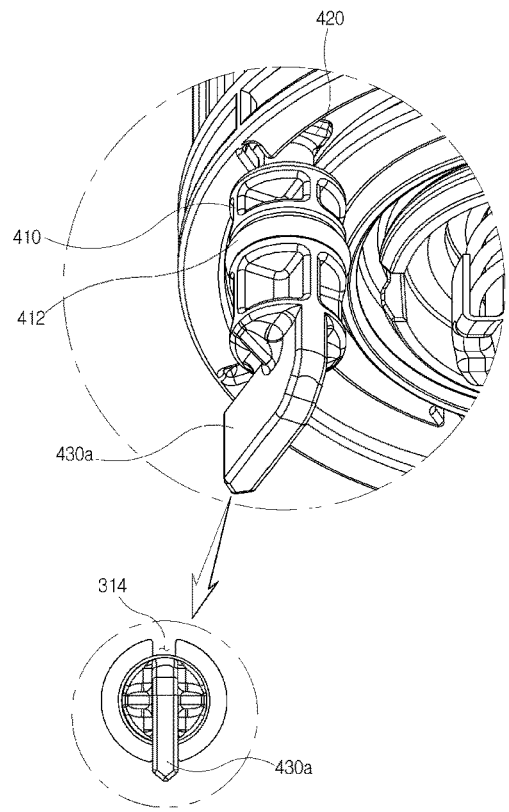
FIGS. 5 and 6 are bottom perspective views illustrating an example of a state in which the drain pin of FIG. 3 is inserted into the rotation groove and a state in which the drain pin is rotated and coupled after being inserted.
Figure 6:
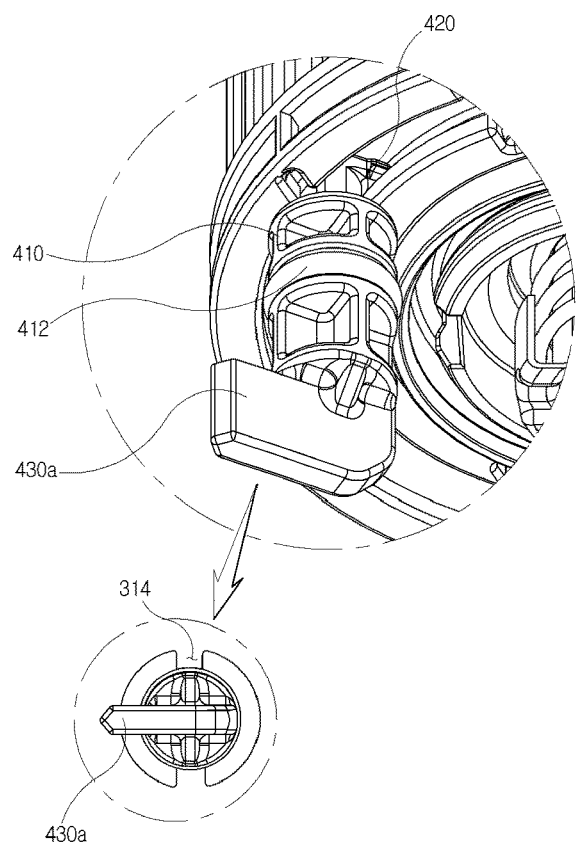

Referring to FIG. 5 or 6 so as to more minutely observe the grip (430a), a portion at which the circular bottom is connected to the grip (430a) may include a starting point of the circular bottom to pass through one diameter. Thus, a rib (460a) may be formed to prevent the grip from being broken when the grip (430a) receives rotation force by the worker. The rib may have a right-angled triangular shape. Two sides that are at right angle in the right-angled triangular shape may be respectively connected to the circular bottom and the grip (430a) to cover the diameter perpendicular to the diameter through which the grip (430a) passes. However, this may be merely an example. For another example, when the grip itself has a portion having a substantially cone shape that extends from a circumference of the circular bottom and a portion that horizontally extends from a portion of the cone shape, the grip may be reinforced without providing a separate rib. The shape of the grip (430a) illustrated in FIG. 3 may be merely an example. Thus, the grip may variously vary in shape to improve worker's convenience.

When the drain pin (400a) is inserted into the drain nipple (310a), the drain pin (400a) may ascend so that the upper end of the drain pin (400a) is closely attached to the bottom surface of the lower support plate (240). Also, the lower end of the drain nipple (310a) is hung on the lower support plate 240 so that the drain pin (400a) is not easily separated from the drain nipple (310a), i.e., does not fall down while the vehicle is driven. That is, it is preferable that the drain pin (400a) is manufactured so that the upper end of the drain pin is hung on the lower support plate (240) or not according to a degree of the rotation of the drain pin in the state in which the drain pin is inserted into the drain nipple (310a).

Figure 4:
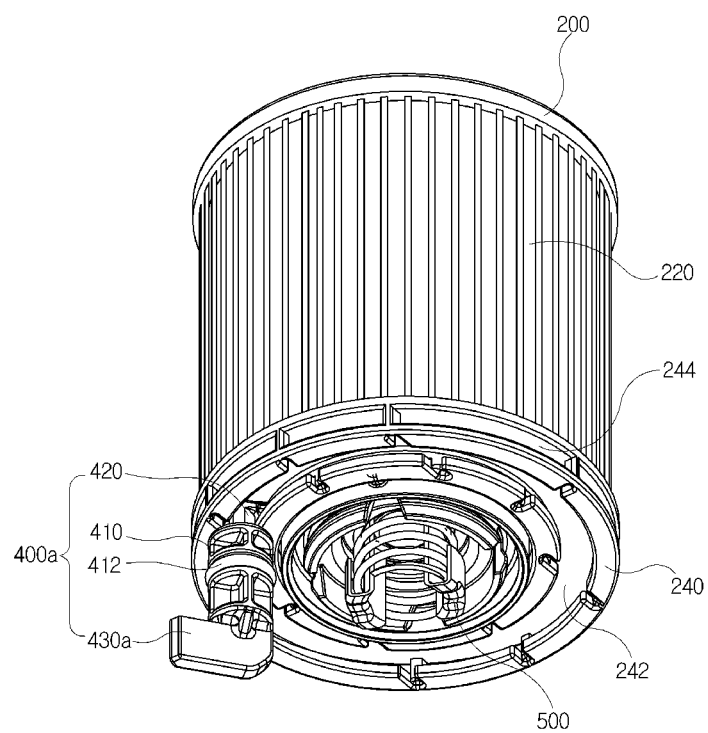
FIG. 4 is a bottom perspective view illustrating an example of a configuration in which the drain pin of FIG. 3 is coupled to a rotation groove.

As a specific unit for this, the fixing block (420) may prevent the drain pin from being separated while the vehicle is driven by fixing the drain pin (400a) to the rotation groove (242) formed in the lower support plate (240) of the filter (200) as illustrated in FIG. 4. As regards the fixing block (420), since the worker does not confirm the rotation groove (242) of the lower support plate (240) by using the naked eye when the drain pin (400a) is coupled, a unit for confirming the insertion direction of the drain pin (400a) is necessary. This may be achieved by the marking groove (314) as illustrated in FIG. 2. When the marking groove (314) is provided in the lower end of the drain nipple (310a), the worker may insert the drain pin to match the position of the grip (430a) and the fixing block (420) on the basis of the position of the marking groove (314). Then, the worker may fix the drain pin (400a) by rotating the drain pin at an angle of about 90 degrees with respect to the marking groove (314).

To realize the above-described coupling, the rotation groove (242) having a ring shape using the rotation shaft of the case (100) as a central axis may be formed in the bottom surface of the lower support plate (240). The rotation groove (242) may be manufactured in a shape in which an inlet is narrower than a bottom surface. Here, a through hole (244) through which the engine liquid, particularly oil or fuel, smoothly flows may be formed in an outer wall of the rotation groove (242).

Here, the fixing block (420) may have a transverse length greater than a width of the inlet of the rotation groove (242). Also, the fixing block (420) may have a longitudinal length less than the width of the inlet of the rotation groove (242). Thus, when a horizontal direction of the fixing block (420) is directed toward a diameter direction of the rotation groove (242) (see FIGS. 6 and 8), the fixing block (420) may not be separated from the rotation groove (242), and the inserted state of the fixing block into the rotation groove (242) may be maintained. When the horizontal direction of the fixing block (420) is directed toward a tangent direction of the rotation groove (242) (see FIG. 5), the fixing block (420) may be inserted into and withdrawn from the rotation groove (242).

When the rotation groove (242) is manufactured in a recessed groove shape, but not in the circular shape, since the recessed groove varies in position according to a placed position of the filter (200), the position on which the filter (200) is placed has to be specified. Alternatively, a unit for matching the position of the recessed groove with the drain nipple (310a) when the cap (300) is screw-coupled to the case (100) has to be separately provided. Also, when the drain pin (400a) is mounted on the rotation axis of the cap (300), the above-described problem may not occur even though the rotation groove (242) is manufactured in one recessed groove shape. In this case, since interference between the drain pin (400a) and the bypass valve (500) occurs, the cap (300) has to be manufactured with a very long vertical length.

In the liquid filter module, particularly the oil filter module or the fuel filter module according to the first embodiment, it is preferable that the rotation groove (242) is manufactured in a ring shape using the rotation axis of the cap (300) as a central axis even though the drain pin (400a) is mounted to be spaced a predetermined distance from the rotation axis of the cap (300). As described above, when the rotation groove (242) is formed in the ring shape, even though a unit for previously determining the position on which the filter (200) is placed to match the drain nipple (310a) with the position of the recessed groove is not separately provided, the drain pin (400a) may be inserted and fixed at any point at which the screw-coupling of the cap (300) is completed.

Figure 8:
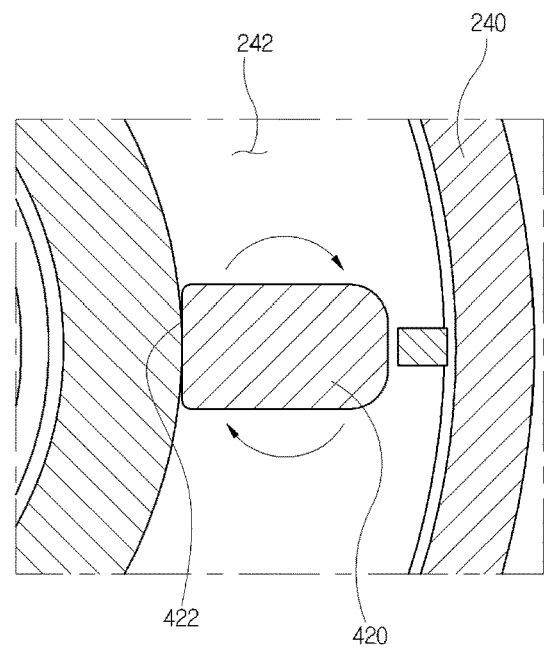
FIG. 8 is a horizontal cross-sectional view of a position on which a fixing block is seated in the rotation groove according to the first embodiment.

It is preferable that one side end (422) of the fixing block (420) in the transverse direction contacts an inner wall surface of the rotation groove (242) and has a polygonal shape with a corner so that the transverse direction of the fixing block (420) is always directed toward the diameter direction of the rotation groove (242). As illustrated in FIG. 8, in the state in which the one side end (422) of the fixing block (420) in the transverse direction contacts the inner wall surface of the rotation groove (242), although external force is applied to the fixing block (420) in an arrow direction, the fixing block (420) may not be rotated to further prevent the drain pin from being unintentionally separated.

Also, the one side end (422) of the fixing block (420) in the transverse direction may be formed in a curved shape to match a curvature of the inner wall surface of the rotation groove (242) so that the entire one side end (422) of the fixing block (420) in the transverse direction contacts the inner wall surface of the rotation groove (242). As described above, when the one side end (422) of the fixing block (420) in the transverse direction is formed in the curved shape, the fixing block (420) may not be rotated at all in the arrow direction of FIG. 8 to more improve the coupling reliability between the fixing block (420) and the rotation groove (242).

Here, if the fixing block (420) is formed of a material that has little elasticity such as a metal, when the drain pin (400a) is rotated to separate the drain pin (400a), the edge portion of the fixing block (420) may be hung on the inner wall surface of the rotation groove (242), and thus, the drain pin (400a) may not be rotated. Thus, the fixing block (420) has to be formed of a material having elasticity greater than a reference value such as a synthetic resin so that the fixing block is not rotated by the external force such as vibration of the engine, and when manipulation force of the worker is applied, the edge portion climbs over the inner wall surface of the rotation groove (242).

Figure 7:
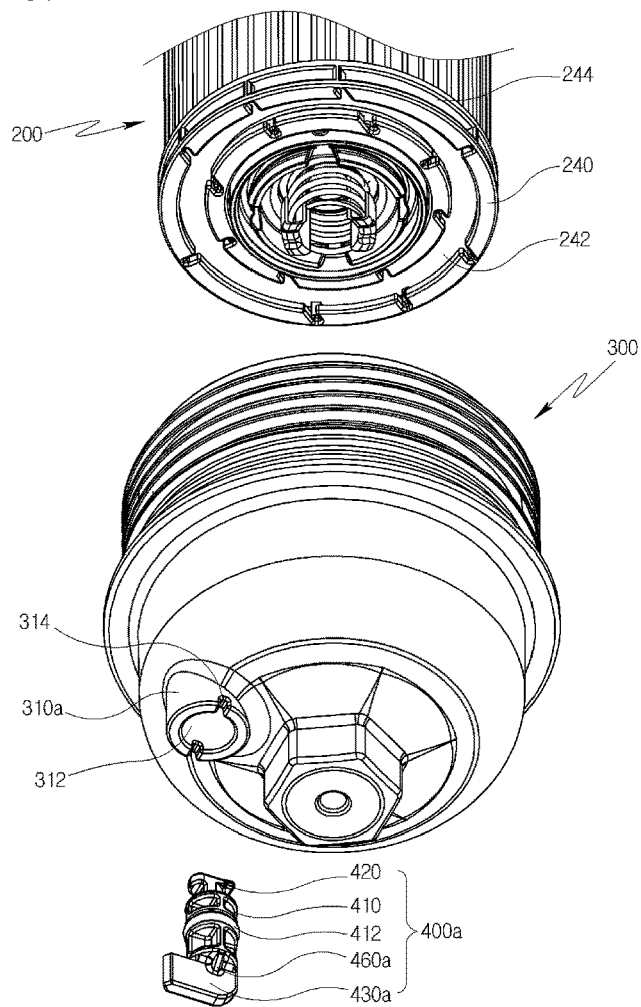
FIG. 7 is an exploded view of a filter, a portion of a housing, and the drain pin according to the first embodiment.

FIG. 7 is an exploded view of the filter (200), the cap (300), and the drain pin (400a). Here, the filter, the cap, and the drain pin are exploded in a direction in which the drain pin (400a) is coupled to the filter (200). As illustrated in FIG. 7, it is seen that the worker sees the position of the marking groove (314) and then inserts the drain pin to match a direction of the grip (430a) with the marking groove (314). After being inserted, when the worker grips the grip (430a) and then pushes the grip upward to the end to rotate the grip at an angle of about 90 degrees, the fixing block (420) may be fixed to the rotation groove (242).

As described above, when the marking groove (314) is formed in the drain nipple (310a), the worker may confirm the direction of the grip (430a) and the position of the marking groove (314) to rotate the drain pin (400a) at an accurate angle. Thus, the drain pin (400a) may be easily attached and detected, and the engine liquid, particularly the oil or the fuel, may be easily drained.

Figure 9:
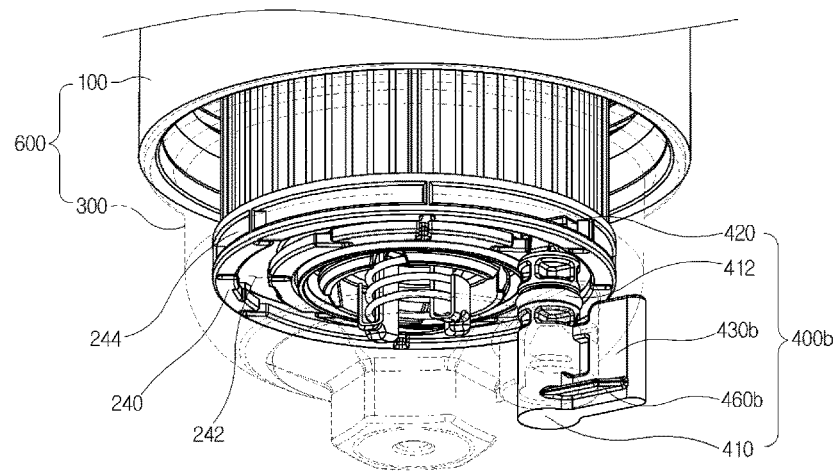
FIG. 9 is a bottom perspective view of a lower portion of an liquid filter module, particularly an oil filter module or a fuel filter module according to a second embodiment of the present invention.
Figure 12:
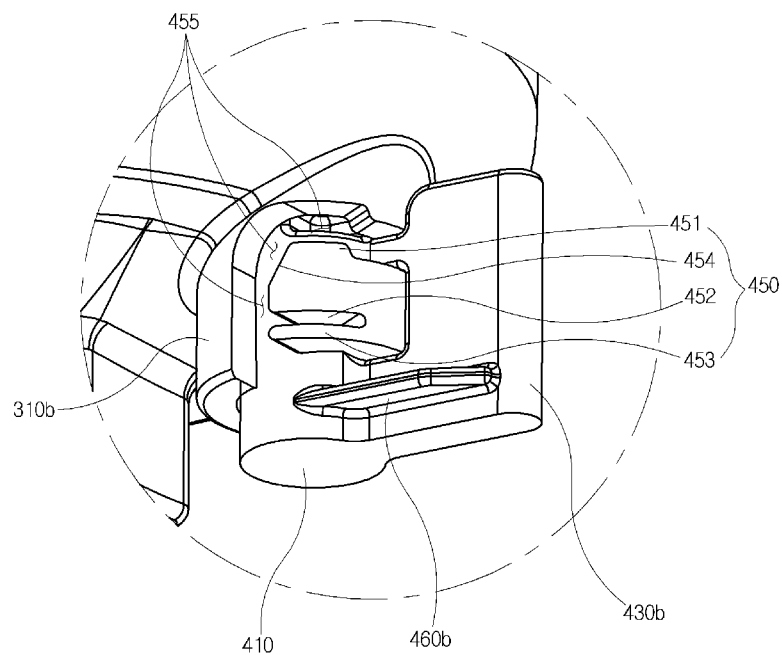
FIG. 12 is an enlarged view of a configuration in which the drain pin is rotated and completely coupled to the drain nipple according to the second embodiment.

FIGS. 9 and 12 illustrate a second embodiment of the present invention.

According to the second embodiment, an liquid filter module, particularly an oil filter module or a fuel filter module includes a housing (600) including a cylindrical drain nipple (310b) on a lower portion thereof so as to drain liquid, particularly the oil or the fuel, a filter (200) accommodated in the housing (600), a drain pin (400b) inserted into the drain nipple (310b), and a first fixing part for detachably fixing the drain pin (400b) to the drain nipple (310b). The drain pin (400b) includes a body (410), a grip (430b) formed on the grip (430b), and a seal member (412) sealing the housing (600) so that the liquid, particularly the oil or the fuel, does not leak out of the housing when the drain pin (400b) is inserted into the drain nipple (310b).

The second embodiment is illustrated in FIG. 9. First, a coupling structure between the grip (430b) and the drain nipple (310b) is provided as a basic structure and is defined as the first fixing part herein. Simultaneously, the fixing part that has been described in the first embodiment is illustrated and defined as a second fixing part. The second fixing part includes a rotation groove (242) defined in a lower support plate (240) provided in a filter (200) and a fixing block (420) formed on an upper end of the drain pin (400b). Thus, the drain pin (400b) may be fixed at two positions to sufficiently prevent the drain pin (400b) from being unintentionally separated. The fixing of the drain pin at the two positions may represent coupling between the rotation groove (242) and the fixing block (420) and between a guide block (450) and an insertion hole (440). However, the fixing method of the second fixing part is not limited to the coupling between the rotation groove (242) and the fixing block (420). Thus, if the drain pin (400b) is firmly coupled by using the second fixing part together with the first fixing part, any part may be substituted for the second fixing part. Since the structure of the second fixing part, i.e., a structure in which the drain pin (400b) is coupled to the lower support plate (240) of the filter (200) is the same as that of the first embodiment, its detailed description will be omitted and partially and complementarily described.

The first fixing part includes the guide block (450) formed on a wall of the drain nipple and the insertion hole (440) formed in the grip (430b) of the drain pin (400b) and into which the guide block (450) is inserted. The liquid filter module, particularly the oil filter module or the fuel filter module according to the second embodiment may include the drain pin (400b) that is inserted into the drain nipple (310b) to rotate and thus is coupled to the drain nipple. Unlike the first embodiment, the grip (430b) may simply have a plate shape that extends laterally from a side surface of the body (410) as well as include one hole in a boundary between the body (410) and the grip (430b). In the present embodiment, the hole defined as the insertion hole (440) may be a component into which the guide block (450) is inserted when the drain pin (400b) is inserted into and coupled to the drain nipple (310b).

Figure 10:
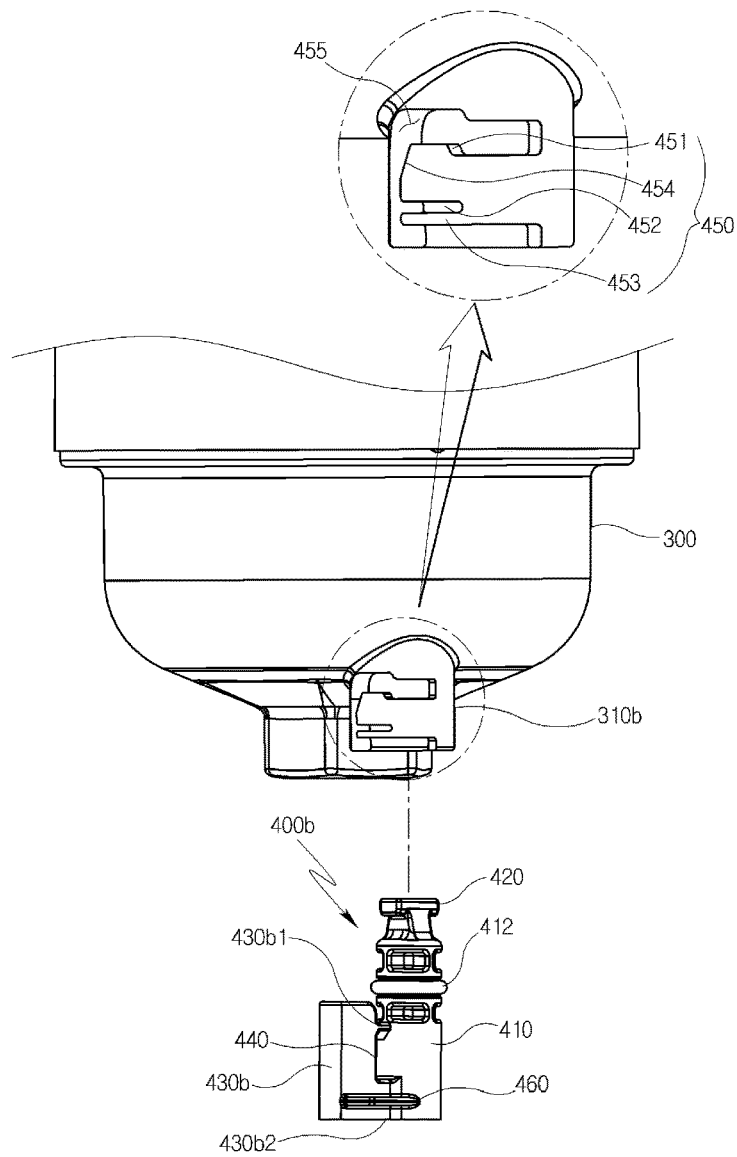
FIG. 10 is a side view illustrating a state in which a drain pin is disposed in a straight line with a drain nipple in an insertion direction of the drain pin according to the second embodiment.
Figure 11:
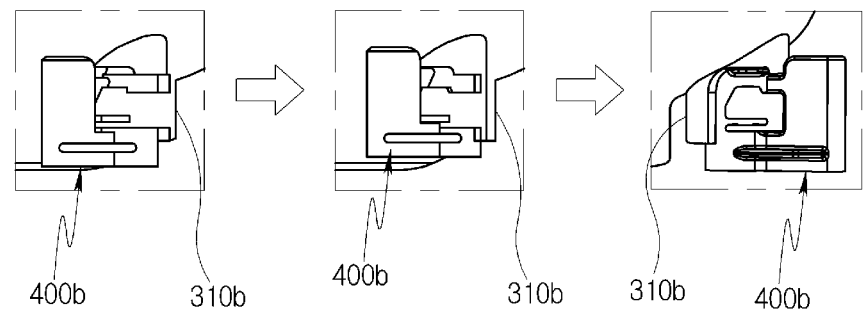
FIG. 11 is an in-use view of a process in which the drain pin is rotated and coupled after being inserted into the drain nipple according to the second embodiment.

As illustrated in FIGS. 10 and 11, when the grip (430b) of the drain pin (400b) is aligned under the drain nipple (310b) to match a vertical portion of a guide slot (455) formed in the drain nipple (310b), the drain pin (400b) may be inserted upward into the drain nipple (310b) by a worker. Here, a first connection part (430b1) and a second connection part (430b2) of the grip are inserted to match the vertical portion of the guide slot (455). Thereafter, the worker may push the grip (430b) in a right (left) direction so that the guide block (450) is inserted into the insertion hole (440) to fix the drain pin (400b) so that the drain pin is not separated downward.

In the present embodiment, the grip (430b) of the drain pin (400b) may extend to be at least exposed to the outside of a wall of the drain nipple (310b) so that the user grips the grip when the drain pin (400b) is removed. Thus, even though the liquid, particularly the oil or the fuel, stagnant in the housing flows down just when the drain pin (400b) is removed, the worker's hands may not be contaminated by the liquid, particularly the oil or the fuel.

The grip (430b) extends to a side surface of the body (410). In the embodiment of FIGS. 9 to 12, the grip may extend from a cylindrical wall of the body (410) and have substantially the same thickness from a boundary between the grip and the body (410) to one end that is opposite to the boundary. In this configuration, the drain pin (400b) may include a rib (460b) to prevent the grip (430b) from being broken. Although the rib (460b) is seen at a left lower portion of the grip (430b) in FIG. 12, the rib may be formed on all left and right sides as illustrated in FIG. 11. The grip (430b) may be reinforced through the rib (460b) to allow the grip to be very strong against an impact applied during the worker's manipulation.

The rib (460b) may be lengthily formed on the lower portion of the body in a direction in which the grip (430b) extends. However, the rib (460b) may be thin and long as illustrated in FIG. 12 as well as thick. Alternatively, the grip may be gradually reduced in thickness from a root portion, at which the lower portion of the grip contacts the body, to the other end of the grip to extend. As a result, the rib may not be separately provided.

All the edge portions of the grip may be angled. However, it is preferable that the grip has a rounded shape. Since the edge of the grip is rounded, the worker may not be injured while treating the drain pin (400b).

In FIG. 12, the grip (430b) extends in a horizontal direction (a direction perpendicular to a longitudinal direction of the body (410)). This may be a configuration for allowing the worker to easily grip the grip. A length extending in the horizontal direction may be changed so that the worker easily grips the grip. The same is true of the height of the grip (430b). However, when the drain pin (400b) is completely inserted, the grip should not be disposed under the bottom part of the housing (600) or the cap (300).

The grip may have various configurations so that the worker easily grips the grip. For example, the grip may basically have substantially a plate shape. However, if the portion griped by the worker is recessed when viewed from both sides of the grip, the worker may more comfortably grip the grip. Similarly, only one surface of the grip may be recessed. For another example, the grip may have a rough surface. Thus, even though the worker' hands are stained with sweat or a liquid, the grip may be manufactured to have frictional force for sufficiently inserting and removing the drain pin. For another example, the grip may have a ring shape. Since the worker inserts a finger into the ring shape due to the grip having the ring shape to manipulate the grip, missing of the drain pin by the worker may be prevented during working.

According to the preferred embodiment, the guide slot (455) includes a stepped protrusion (451) for preventing the guide protrusion from being reversely rotated. The stepped protrusion (451) may be provided to improve the downward separation prevention effect. The stepped protrusion (451) may have a stair shape or an inclined shape. That is, the stepped protrusion may have various shapes that are capable of preventing the separation.

More preferably, the guide block (450) includes a cutoff part (452) and a tension part (453). The cutoff part (452) is formed between the stepped protrusion (451) and the tension part (453), and the tension part (453) may be elastically deformable in a direction of the cutoff part (452). Thus, even though a width from an upper end of the stepped protrusion (451) to a lower end of the tension pat (453) is greater than that of the insertion hole (440), when the tension part is elastically deformed toward the cutoff part (452), the guide block (450) may be inserted into the insertion hole (440).

The fixing part may additionally include a tapered portion (454) at an inlet side of the guide slot (455). When the grip (430b) is rotated to fix the drain pin (400b), the drain pin may be more easily inserted due to the elastically deformable cutoff part (452). That is, although the width from the upper end of the stepped protrusion (451) to the lower end of the tension pat (453) is greater than that of the insertion hole (440), since the tapered portion (454) is formed, an initial width of the guide block (450) may be sufficiently less than the width of the insertion hole (440).

Similarly, a portion opposite to the tapered portion (454) of the stepped protrusion (451) may be formed in an inclined shape, but not the stair shape. Due to the inclined shape, the guide block (450) may have a width less than that of the insertion hole (440) at a portion at which the tension part (453) is not elastically deformed at all. Of course, a range occupied by the stepped protrusion (451) may be less than a length of the cutoff part (452) to solve the foregoing problem.

According to further another preferred embodiment, the housing (600) may include a case (100) having an opened lower portion and a cap (300) screw-coupled to the case (100) to cover the opened lower portion of the case (100). In the liquid filter module, particularly the oil filter module or the fuel filter module, the drain nipple (310b) may be formed on the cap (300b), and the cap (300) may be separable.

Since the first fixing part and the second fixing part are provided, the drain pin (400b) may be more firmly fixed. A bottom surface of the rotation groove (242) may have a width less than that of an inlet thereof, a transverse length of the fixing block (420) may be greater than the width of the inlet of the rotation groove (242), a longitudinal length of the fixing block (420) may be less than the width of the inlet of the rotation groove (242). A transverse direction of the fixing block (420) may match a direction in which the grip (430b) extends from the body (410). Thus, as illustrated in FIG. 10, when the drain pin (400b) is inserted in the state in which the first and second connection parts of the grip (430b) match the guide slot (455), the fixing block (420) may be smoothly seated into the rotation groove (242). Thus, when the drain pin (400b) is fixed by using the first fixing part, the fixing block (420) may be oriented to the position at which the fixing block is fixed to the rotation groove (242). The first fixing part and the second fixing part may fix the drain pin (400b) at the same time. Also, as described in the first embodiment, even through the marking groove (314) is not provided, the worker may accurately determine the position of the drain pin (400b).

Although the present invention is described in detail with reference to the preferred embodiments, the technical scope of the present invention is not limited to only the specific embodiment and thus should be construed by the appended claims. Also, it will be understood by those skilled in the art that various changes in form and details may be made therein without departing from the spirit and scope of the invention as defined by the appended claims.

The invention claimed is:

1. A liquid filter module comprising:
   a housing including a cylindrical drain nipple arranged on a lower portion thereof, the drain nipple configured to drain a liquid;
   a filter accommodated in the housing;
   a drain pin inserted into the drain nipple, the drain pin including:
   a body;

a grip having a portion that at least protrudes outward from a wall of the drain nipple when the drain pin is inserted into the drain nipple; and a seal member configured to seal the housing and prevent the liquid from leaking from the housing when the drain pin is inserted into the drain nipple;

wherein the filter includes a lower support plate having a rotation groove facing towards the drain nipple, the drain pin detachably coupled to the lower support plate when the drain pin is inserted into the drain nipple; and wherein the drain pin further includes a fixing block disposed on an upper end thereof, the fixing block coupled to the rotation groove of the lower support plate when the drain pin is inserted into the drain nipple.

2. The liquid filter module according to claim 1, wherein the portion of the grip protrudes outward in a lateral direction from a downward extension line of a cylindrical wall of the drain nipple when the drain pin is inserted into the drain nipple.

3. The liquid filter module according to claim 2, wherein the drain pin further includes a rib arranged on a portion of the drain pin where the grip and the body are connected to each other, the rib configured to reinforce the grip and to prevent the grip from being broken.

4. The liquid filter module according to claim 2, wherein the grip has a plate shape.

5. The liquid filter module according to claim 2, wherein the grip has a ring shape.

6. The liquid filter module according to claim 1, wherein the drain pin further includes a rib arranged on a portion of the drain pin where the grip and the body are connected to each other, the rib configured to reinforce the grip and to prevent the grip from being broken.

7. A liquid filter module comprising:
a housing including a cylindrical drain nipple arranged on a lower portion thereof, the drain nipple configured to drain a liquid;
a filter accommodated in the housing;
a drain pin inserted into the drain nipple;
a first fixing part detachably fixing the drain pin to an inside of the drain nipple;
wherein the drain pin includes:
a body;
a grip disposed on the body; and
a seal member configured to seal the housing and prevent the liquid from leaking from the housing when the drain pin is inserted into the drain nipple; and
wherein the first fixing part includes a guide block disposed on a wall of the drain nipple, and an insertion hole disposed in the grip of the drain pin in which the guide block is arranged.

8. The liquid filter module according to claim 7, wherein the grip is disposed on a side surface of the body and has a plate shape extending in a lateral direction of the body.

9. The liquid filter module according to claim 7, wherein the guide block includes a stepped protrusion configured to prevent the drain pin from being reversely rotated.

10. The liquid filter module according to claim 9, wherein the stepped protrusion is a stair shape.

11. The liquid filter module according to claim 9, wherein the guide block includes a cutoff part and a tension part, the cutoff part disposed between the stepped protrusion and the tension part such that the tension part is elastically deformable in a direction of the cutoff part.

12. The liquid filter module according to claim 7, wherein the guide block includes a tapered portion such that a width of the guide block gradually increases in a direction in which the drain pin is inserted into the drain nipple.

13. The liquid filter module according to claim 7, further comprising a second fixing part.

14. The liquid filter module according to claim 13, wherein the second fixing part includes:
a rotation groove disposed in a lower support plate of the filter; and
a fixing block disposed on an upper end of the drain pin and coupled to the rotation groove.

15. The liquid filter module according to claim 14, wherein a transverse length of the fixing block is greater than a width of an inlet of the rotation groove, and a longitudinal length of the fixing block is less than the width of the inlet of the rotation groove.

16. The liquid filter module according to claim 7, wherein the drain pin further includes a rib arranged on a portion of the drain pin where the grip and the body are connected to each other, the rib configured to reinforce the grip and to prevent the grip from being broken.

17. The liquid filter module according to claim 1, wherein the housing includes a case and a cap, and wherein the drain nipple is provided on the cap.

18. The liquid filter module according to claim 1, wherein a transverse length of the fixing block is greater than a width of an inlet of the rotation groove, and a longitudinal length of the fixing block is less than the width of the inlet of the rotation groove.

19. An oil or fuel filter module, comprising:
a housing;
a cylindrical drain nipple arranged on a lower portion of the housing;
a filter including a lower support plate;
a drain pin insertable into the drain nipple, the drain pin including:
a body;
a grip disposed on the body, the grip having a plate shape that extends in a lateral direction of the body; and
a seal disposed on the body to seal the drain pin within the drain nipple; and
a fixing part configured to detachably fix the drain pin to the lower support plate of the filter, wherein the fixing part includes a rotation groove disposed on the lower support plate, and a fixing block disposed on an upper end of the drain pin and coupled to the rotation groove.

20. The oil or fuel filter module according to claim 19, further comprising a further fixing part detachably fixing the drain pin to an inside of the drain nipple, the further fixing part including an insertion hole disposed in the grip of the drain pin and a guide block disposed on a wall of the drain nipple, the insertion hole configured to receive the guide block when the drain pin is inserted within the drain nipple.

* * * * *